US011685121B2

(12) United States Patent
Rakshit

(10) Patent No.: US 11,685,121 B2
(45) Date of Patent: Jun. 27, 2023

(54) COMPUTER CONTROLLED SELECTIVE HARDENING OF 3-DIMENSIONAL PRINTED OBJECTS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 16/999,572

(22) Filed: Aug. 21, 2020

(65) Prior Publication Data
US 2022/0055309 A1 Feb. 24, 2022

(51) Int. Cl.
*B29C 64/393* (2017.01)
*B33Y 50/02* (2015.01)
*B33Y 10/00* (2015.01)
*G05B 19/4099* (2006.01)
*B29C 64/106* (2017.01)

(52) U.S. Cl.
CPC .......... *B29C 64/393* (2017.08); *B29C 64/106* (2017.08); *B33Y 10/00* (2014.12); *B33Y 50/02* (2014.12); *G05B 19/4099* (2013.01); *G05B 2219/49023* (2013.01)

(58) Field of Classification Search
CPC ... B29C 64/393; B29C 64/106; B29C 64/386; B33Y 10/00; B33Y 50/02; B33Y 70/00; G05B 19/4099; G05B 2219/49023
See application file for complete search history.

(56) References Cited

U.S. PATENT DOCUMENTS 10,960,608 B2 3/2021 Yorozu
2016/0368056 A1* 12/2016 Swaminathan ....... B29C 64/153
(Continued)

FOREIGN PATENT DOCUMENTS

CN 108788143 A 11/2018
CN 110763715 A 2/2020
(Continued)

OTHER PUBLICATIONS

"New glue instantly hardens with electric current", Nanyang Technological University, ScienceDaily, 4 pps., May 29, 2016, <https://www.sciencedaily.com/releases/2016/05/160529175831.htm>.
(Continued)

*Primary Examiner* — Michael M. Robinson
(74) *Attorney, Agent, or Firm* — Aaron Pontikos

(57) ABSTRACT

A method for variable hardness within three-dimensional (3D) printing. Metadata associated with a print object as a 3D printing copy of an original object is received, the metadata includes data indicating a level of hardness of a portion of the print object. During 3D printing set of parameters including a voltage and a duration are applied to the printing material, such that the level of hardness associated with the metadata of the original object is attained. During printing, the level of hardness is measured using an ultrasonic device, and responsive to determining the level of hardness of the portion of the print object differs from the metadata associated with the portion of the original object, the set of parameters for the portion of the print object are adjusted to attain a target level of hardness as indicated by the metadata of the original object.

20 Claims, 3 Drawing Sheets

(56) References Cited

U.S. PATENT DOCUMENTS

2017/0312821 A1* 11/2017 DeFelice ................. B22F 10/50
2018/0311757 A1   11/2018 Bucknell
2019/0299538 A1   10/2019 Yorozu
2020/0393813 A1* 12/2020 Gupta .................... B22F 10/85

FOREIGN PATENT DOCUMENTS

CN       112083650 A    12/2020
JP       2019065397 A    4/2019

OTHER PUBLICATIONS

"The Electric 3D Printer", RepRap Ltd, Apr. 20, 2020, 12 pps., <https://reprapltd.com/documentation/the-electric-3d-printer/>.
Kelly et al., Volumetric additive manufacturing via tomographic reconstruction, Science, Mar. 8, 2019, vol. 363, Issue 6431, pp. 1075-1079, DOI: 10.1126/science.aau7114, <https://science.sciencemag.org/content/363/6431/1075>.
Liashenko et al., "Ultrafast 3D printing with submicrometer features using electrostatic jet deflection", Nature Communications, 9 pps., <https://www.nature.com/articles/s41467-020-14557-w>.
Ping et al., "Adhesive curing through low-voltage activation", Aug. 18, 2015, Nature Communications, 10 pps., Doi:10.1038/ncomms9050.
International Search Report and written Opinion dated Sep. 10, 2021 from International Application No. PCT/CN2021/101046 filed Jun. 8, 2021.

* cited by examiner

COMPUTER CONTROLLED SELECTIVE HARDENING OF 3-DIMENSIONAL PRINTED OBJECTS

FIELD OF THE INVENTION

The present invention relates generally to the field of additive manufacturing and more particularly to three-dimensional (3D) printing using selective hardening of the printed material.

BACKGROUND OF THE INVENTION

Additive manufacturing techniques include 3D printing in which computer-controlled processes create three-dimensional objects by depositing material in layers. Traditional manufacturing techniques often include machining or removing material to create an object, whereas, in contrast, 3D printing builds the object layer by layer.

3D printing has limitations that include dependency on accurate and complete data of the object to be printed, often supplied by object scanners or computer-aided design data. Additional limitations include the use of a single printing material to efficiently create a printed object. Multiple material requirements involve changes in printing nozzles and material delivery parts and can involve additional setup activity.

SUMMARY

Embodiments of the present invention disclose a method, computer program product, and system. The embodiments include a method for three-dimensional (3D) printing including hardness variation of a printed object. The method provides for one or more processors receiving metadata associated with a print object as a 3D printing copy of an original object, the metadata including data indicating a level of hardness of a portion of the print object. The one or more processors applying, during 3D printing of the print object, a pre-determined set of parameters including an electrical voltage and a duration of applying the electrical voltage to the printed material, wherein the set of parameters are associated with a target of the level of hardness for the portion of the print object as indicated by the metadata associated with the 3D printing of the copy of the original object. The one or more processors measuring during a printing of the printed material to the print object, the level of hardness for the portion of the print object, by use of an ultrasonic device, and in response to determining the level of hardness of the portion of the print object differs from the metadata associated with the level of hardness of the portion of the original object, the one or more processors adjusting the set of parameters applied to the printed material to attain the level of hardness for the portion of the print object as indicated by the metadata of the original object.

DETAILED DESCRIPTION

Figure 1:
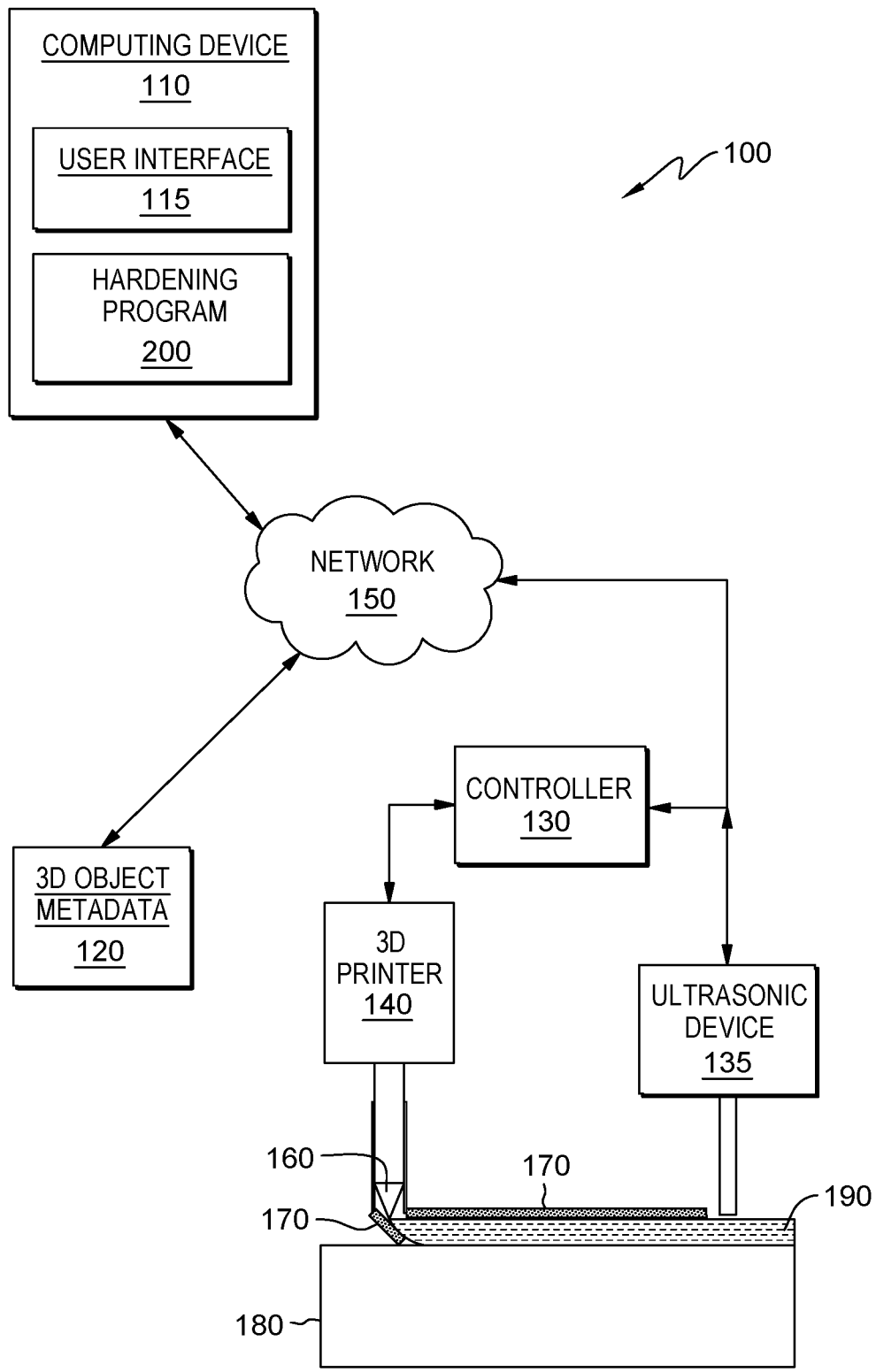
FIG. 1 is a functional block diagram illustrating a distributed data processing environment, in accordance with an embodiment of the present invention.

Embodiments of the present invention recognize that 3D printing of objects has limitations associated with printing objects that include portions that require various hardness. Printing objects with hardness variation currently requires making printing material changes, cleaning and preparing delivery apparatus, and incurs setup time delays, not to mention issues with effective bonding of different materials to produce a stable printed object. Embodiments recognize that the delays associated with material changes and setup activity lengthen 3D printing manufacturing time, making the use of the technique prohibitive.

Embodiments also recognize that in some instances an object includes a level of hardness of material to provide structural strength and resistance to impact, whereas other portions of the object include softer, more flexible material to accommodate adjustment and movement associated with functionality. One potential area of improvement in which variation of hardness within the manufacture of objects is required includes bio prosthetics and requirements of variation of hardness within an object that may apply to several other fields as well.

Embodiments of the present invention provide a method, computer program product, and computer system to provide selective hardening of material for portions of a printed object during 3D printing. Embodiments apply a low-level electrical voltage (hereafter "voltage") for a predetermined duration to achieve a target level of hardness for a portion of the object. The hardness is controlled by dynamic adjustment of the applied voltage and duration. Embodiments enable varying degrees of hardness within the printed object without making changes to materials and nozzles used in 3D printing and requiring additional processing to ensure bonding between different materials, thus improving manufacturing efficiency.

Embodiments of the present invention include use of instant curing liquid materials that are activated to cure (i.e. hardening) when a low-level voltage (e.g. −2V vs. Ag/AgCl) is applied for a duration, enabling tuning of the hardness by variation in the voltage and duration of applying the voltage to the material. An example of electro-curing materials was reported by Nanyang Technological University (ScienceDaily, 29 May 2016; Nanyang Technological University. "New glue instantly hardens with electric current"); and discussed further in Nature Communications: (Ping, J. et al. Adhesive curing through low-voltage activation. *Nat. Commun.* 6:8050 doi:10.1038/ncomms9050 (2015)).

In some embodiments, electrodes are in contact with the printed/printing material (hereafter referred to as just "printing material"), as it is printed to the object. In some embodiments, an elongated electrode remains in contact with the printing material enabling a duration of an applied voltage. In other embodiments, the movement of the nozzle head of the 3D printing apparatus is controlled to provide the appropriate duration of the applied voltage to the printing material. In yet other embodiments, an extendable electrode is used to contact the printing material to adjust the duration of applying the voltage to attain the target hardness. An extendable electrode may include the curling of a flexible electrode that is curled and uncurled to adjust the length of the electrode and the duration of the applied voltage to the printing material.

In some embodiments of the present invention, a computing device receives 3D metadata of the object to be printed that includes information for printing the object and includes information regarding the hardness of the portions of the object. In some embodiments, the hardness metadata is obtained by ultrasonic measurement of the portions of the object and included in the metadata used by the controlling program during 3D printing by applying the voltage to the printing material for a determined duration.

In some embodiments, a plurality of printing condition parameters, including voltage level and duration, is applied to the electro-curing material to generate a knowledge corpus of the solidification and hardness process that associates a set of parameter values with a corresponding hardness of the printing material. The hardness of the respective printing condition parameters of the plurality printing instances is measured by an ultrasound measuring device. In some embodiments, a determined relationship between the voltage and duration applied to the printing material and the resulting hardness of the cured material is established and applied to subsequent 3D object printing via computer program control.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed data processing environment 100 includes 3D printer 140, nozzle 160, electrodes 170, print object 180, and hardening portion 190. Distributed data processing environment 100 also includes computing device 110, 3D object metadata 120, controller 130, and ultrasonic device 135, all interconnected via network 150. Network 150 can be, for example, a local area network (LAN), a wide area network (WAN), such as the Internet, a virtual local area network (VLAN), or any combination that can include wired, wireless, or optical connections. Network 150 may be connected to a local 3D printing network. In general, network 150 can be any combination of connections and protocols that will support communications between computing device 110, 3D object metadata 120, and controller 130, in accordance with embodiments of the present invention.

Computing device 110 is capable of performing programmable operations and communicating with other devices of distributed data processing environment 100. Computing device 110 includes user interface 115 and hardening program 200. Computing device 110 communicates via network 150 to 3D object metadata 120 and controller 130. Computing device 110 accesses and receives data from 3D object metadata 120 including the 3D printing instructions and hardness data associated with print object 180 and provides the printing instruction and hardness data to hardening program 200. Computing device 110 receives feedback of hardening portion 190 from ultrasonic device 135 via network 150, making the hardness feedback data available to hardening program 200. In some embodiments, computing device 110 includes a knowledge corpus of voltage and duration parameters to achieve a particular level of hardness in the printing material. In other embodiments, computing device 110 receives voltage and duration parameters from the knowledge corpus located in another accessible repository of distributed data processing environment 100, such as 3D object metadata 120, or other data storage repository accessible via network 150 (not shown).

In some embodiments, computing device 110 may be a server computer, a laptop computer, a tablet computer, a smartphone, smartwatch, a wearable computing device, or any programmable electronic mobile device capable of communicating with various components and devices within distributed data processing environment 100, via network 150. In another embodiment, computing device 110 represents a computing system utilizing clustered computers and components (e.g., database server computers, application server computers, etc.) that act as a single pool of seamless resources when accessed within distributed data processing environment 100. In general, computing device 110 represents one or more programmable electronic devices or a combination of programmable electronic devices capable of executing machine-readable program instructions and communicating with hardening program 200, via network 150. Computing device 110 may include internal and external hardware components, depicted in more detail in FIG. 3.

User interface 115 provides an interface to access the features and functions of computing device 110. In some embodiments of the present invention, user interface 115 provides access to hardening program 200, and may also support access to other applications, features, and functions of computing device 110 (not shown). In some embodiments, user interface 115 provides display output and input functions for computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Hardening program 200 is depicted as operating on computing device 110. In some embodiments, hardening program 200 receives scanned data and hardness data associated with the portions of print object 180 from 3D object metadata 120. Hardening program 200 provides printing instruction to controller 130 for the operation of 3D printer 140 and instruction for applying voltage and duration of voltage to electrodes 170 to achieve a pre-determined level of hardness of hardening portion 190. In other embodiments, controller 130 receives scanned data of print object 180 from 3D object metadata 120 and receives voltage and duration parameters from hardening program 200. In some embodiments, hardening program 200 transmits hardening parameter data to controller 130 dynamically, receiving feedback of hardness of hardening portion 190 via ultrasonic device 135 and adjusting voltage and duration parameters to achieve the appropriate level of hardness. In other embodiments, hardening program 200 accesses a knowledge corpus of voltage and duration data that results in a determined hardness of the printing material and applies the respective knowledge corpus data to hardening portion 190 of 3D print object 180.

In some embodiments, instruction from hardening program 200 to controller 130 results in voltage applied to electrodes 170, and for the voltage to remain applied for a predetermined duration. In some embodiments, the duration of the applied voltage to the printing material is controlled by extending or retracting one electrode of electrodes 170, which may be, for example, oriented in a curled configuration and extended or retracted to adjust the contact duration of the electrode. In other embodiments, the duration of the applied voltage may be controlled by the printing speed of 3D printer 140, or a combination of printing speed and electrode contact adjustment.

In an alternative embodiment of the present invention, wires may be added during 3D printing, based on data received by controller 130 from hardening program 200, positioned in portions of print object 180 that require additional hardening. The inserted wires may have non-insulated areas corresponding to the portion of print object 180 that requires additional hardening, and the voltage and duration are applied subsequent to 3D printing, and the wires subsequently removed from print object 180 (wire insertion and removal not shown).

3D object metadata 120 includes stored data from 3D scanning of the original object corresponding to print object 180. In some embodiments, 3D object metadata 120 includes data from which controller 130 operates 3D printer 140 to generate print object 180. 3D object metadata 120 also includes data indicating the hardness requirements of the various portions of print object 180. In some embodiments, the hardness requirements of the portions of print object 180 are obtained by ultrasonic measurement of the original object from a device, such as ultrasonic device 135.

Controller 130 provides control instruction to 3D printer 140, controlling the application of printing material to printed object 180 via nozzle 160. In some embodiments, controller 130 receives control instruction from 3D object metadata 120 for controlling the positioning of printing material applied to print object 180, such as hardening portion 190. In such embodiments, controller 130 receives instruction associated with applying hardening parameters to the applied printing material from hardening program 200. In other embodiments, controller 130 receives both object scanning data for printing print object 180 and hardness parameters for applying voltage for a duration from hardening program 200. In some embodiments, hardening program 200 dynamically adjusts the voltage and/or duration of applying the voltage to hardening portion 190 based on feedback data received from ultrasonic device 135 measuring the hardness of hardening portion 190 as it is applied to print object 180.

Ultrasonic device 135 emits an ultrasonic beam directed to the printing material as the printing material contacts electrodes 170 and measures the hardness of the material, such as hardening portion 190. Ultrasonic device 135 transmits the detected signal measuring the hardness of hardening portion 190 to hardening program 200 operating on computing device 110, via network 150. In some embodiments of the present invention, ultrasonic device 135 (or similar device) measures a plurality of printing material receiving varying sets of voltage and duration parameters, resulting in variation of the level of hardness of the printing material. In some embodiments, the plurality of measurements is used to generate a knowledge corpus relating to the level of hardness of the printing material to the voltage and duration parameters applied to the printing material. In some embodiments, the knowledge corpus relating hardness of the printing material to the voltage and duration parameters applied to the printing material is used to provide instruction for achieving an intended level of hardness for a portion of print object 180.

3D printer 140 represents the mechanical and electrical apparatus and printing material source for performing 3D printing operations. 3D printer 140 receives input from controller 130 that manages the direction and speed of printing, and the deposition rate of printing material via printing nozzle 160. 3D printer 140 includes an electro-curable printing material in a format enabling continuous deposition through printing nozzle 160 and contact of the printing material by electrodes 170. In some embodiments of the present invention, 3D printer 140 includes electrodes 170 positioned to contact printing material as it is applied to print object 180. In other embodiments, 3D printer 140 includes placement of wires during printing, such that the wires may receive a predetermined voltage for a predetermined duration to attain a target hardness for a particular portion of print object 180 (wire insertion not shown). In yet other embodiments, an initial set of parameters of voltage and duration of voltage are applied to the 3D printing of print object 180, such that a lowest level of required hardness is attained for the printing material of print object 180. Subsequent to 3D printing, holes are drilled into print object 180 to insert wires and attain a higher target level of hardness of the print material for a portion of print object 180. Subsequent to additional hardening of the portion of print object 180, the wires are removed (drilling of holes, insertion of wires, and removal of wires not shown).

Printing nozzle 160 is a component of 3D printer 140 and performs deposition of printing material on to print object 180. In some embodiments, printing nozzle 160 may include electrodes 170 in adjacent positions enabling contact with the printing material. In some embodiments, printing nozzle 160 may receive input from controller 130 adjusting the deposition rate of the printing material. In embodiments of the present invention, printing nozzle 160 receives one type of electric-curing printing material, avoiding changes to printing nozzle 160 to attain various levels of hardness within print object 180.

Electrodes 170 are a set of electrical contacts conducting the applied voltage to the printing material for the predetermined duration. In some embodiments, one of electrodes 170 is elongated and maintains contact with the printing material, such as hardening portion 190, for an extended duration. In some embodiments, the duration of contact of electrodes 170 is controlled by the movement of the printing head of 3D printer 140. In other embodiments, at least one of electrodes 170 is configured to perform a length adjustment to increase or decrease the duration of contact with the printing material to achieve the target level of hardness. For example, one of electrodes 170 may be constructed of flexible material with a conductive surface and include a curled section that can be extended to lengthen or contracted to shorten, the amount of contact of electrodes 170 with the printing material.

Print object 180 is the 3D printing copy of the original object. Print object 180 is generated by 3D printing by layers of applied printing material positioned according to instructions to controller 130 from hardening program 200 that include received metadata from 3D object metadata 120 and transmitted via network 150. Print object 180 results from multiple layers of printing material applied to previous layers, such as hardening portion 190, which is a portion of printing material applied to print object 180 and hardened to a target level of hardness by applying voltage and a duration applying the voltage by electrodes 170.

Figure 2:
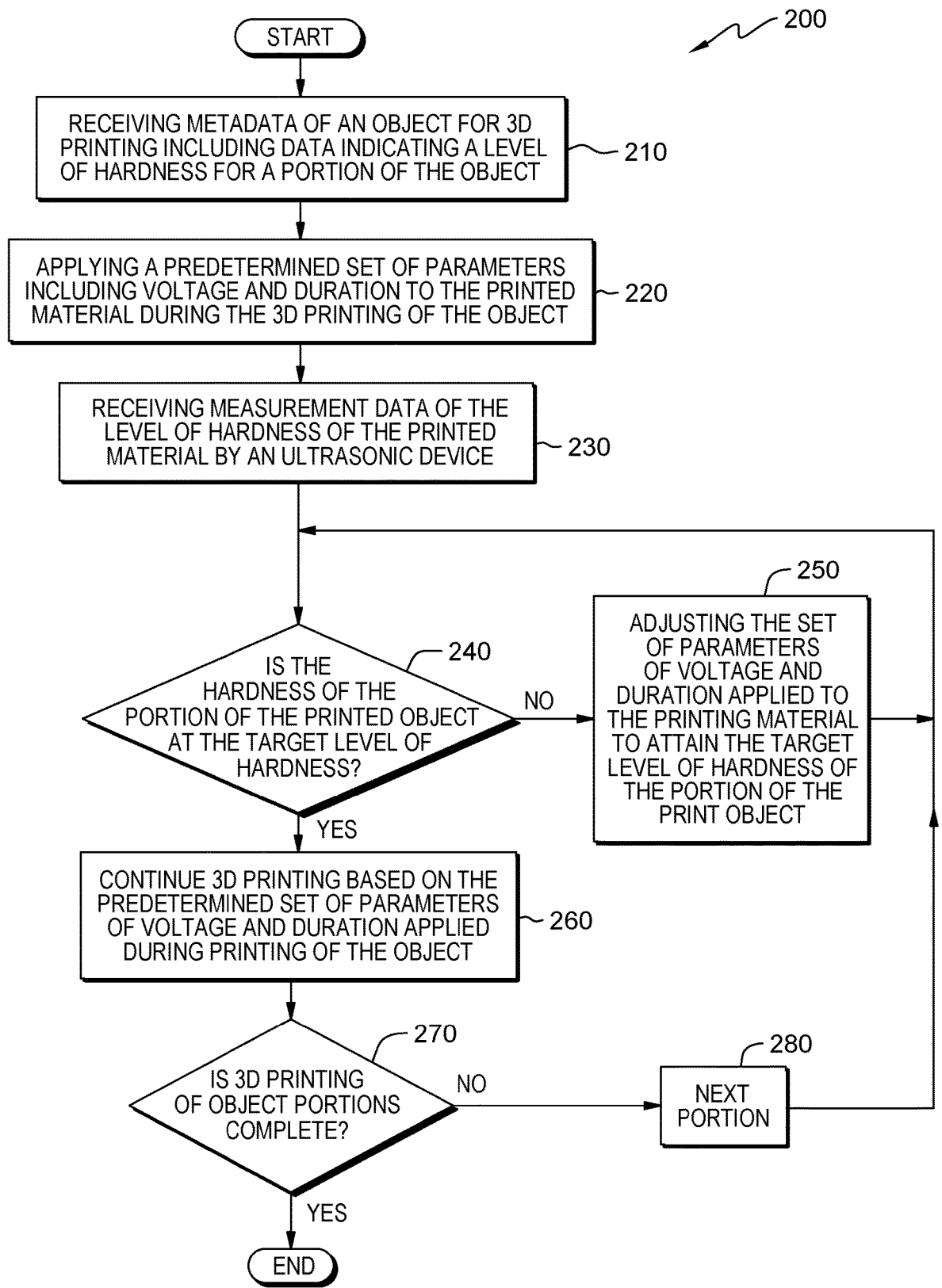
FIG. 2 is a flowchart depicting operational steps of a hardening program, operating in the distributed data processing environment of FIG. 1, in accordance with embodiments of the present invention.

FIG. 2 is a flowchart depicting the operational steps of one embodiment of hardening program 200. Hardening program 200 receives scanned data and hardness data associated with the portions of print object 180 from 3D object metadata 120. Hardening program 200 provides printing instruction to controller 130 for the operation of 3D printer 140 and instruction for applying voltage and duration of voltage to electrodes 170 to achieve a pre-determined target level of hardness of hardening portion 190. Hardness program 200 receives real-time measurement data of hardness of printing material applied to print object 180 and receiving voltage for a duration by electrode contact. Hardness program 200 receives the measurement data from an ultrasonic measurement device and determines whether the printing material has attained the target level of hardness for a particular portion of the print object, and in response to determining the hardness of the portion differs from the target level of hardness, hardening program 200 adjusts the parameter set of the voltage applied and duration of the voltage applied to attain the target level of hardness for the portion.

Hardening program 200 receives metadata of an object for 3D printing, including data indicating a level of hardness for a portion of the object (step 210). In some embodiments of the present invention, hardening program 200 accesses and receives metadata from scanning an object for 3D printing and hardness information associated with portions of the object that require a variation in the level of hardness for the respective portions. In some embodiments, the hardness of the object's portions is determined by an ultrasonic measurement device during the scanning of the object or prior to printing and included in the metadata of the object. A portion of the printed object may be an area or volume subset of the object and may be of any size from a single deposition line of printing material to a layer area of printing material, to multiple layers of printing material, to large percentages of the volume of the printed object.

For example, the original object receives a 3D scan and ultrasonic measurement for the level of hardness of portions of the original object. The data from the scan and ultrasonic measurements are included in a metadata file and stored in 3D object metadata 120. Hardening program 200 accesses 3D object metadata 120 and receives the 3D scanning and hardness measurement metadata for the original object.

Hardening program 200 applies a predetermined set of parameters including voltage and duration of the applied voltage to the printing material during the 3D printing of the object (step 220). Based on the level of hardness required for the portion of the printed object currently printing, hardening program 200 applies a low voltage (e.g., $-2V$ Ag/AgCl) to the printing material during printing activity. Hardening program 200 maintains the applied voltage for a predetermined duration corresponding to the required level of hardness for the respective portion in which a longer duration of applying the voltage results in an increase in the level of hardness of the printing material. In some embodiments, hardening program 200 can adjust the voltage to affect the hardness of the printing material. In other embodiments, hardening program 200 can utilize a combination of voltage adjustment and duration of applied voltage to attain the target level of hardness for the portion of the printed object.

In some embodiments, a knowledge corpus is generated by depositing a plurality of electro-curable printing material and applying a range of parameters that include a low voltage applied to the printing material for a duration and measuring the hardness attained for each instance of voltage/duration combination. The knowledge corpus includes data indicating the level of hardness attained by applying a particular voltage for a specific duration of time for a range of durations at a voltage, and in some embodiments, at different voltages.

For example, hardening program 200 applies a $-2$ V charge to hardening portion 190 via electrodes 170, and one of electrodes 170 is extended to maintain the voltage applied to hardening portion 190 for a predetermined duration, based on the speed of printing, which is controlled through hardening program 200 instruction to controller 130, and input to 3D printer 140 from controller 130. The predetermined duration of applying the voltage is based on data included in the generated knowledge corpus for a specific electro curing printing material.

Hardening program 200 receives measurement data, from an ultrasonic device, of the level of hardness of the printing material (step 230). During 3D printing of the copy of the original object, hardness measurements are taken by an ultrasonic device and sent to hardening program 200. In some embodiments, the ultrasonic device is configured and positioned to provide measurement reading of the level of hardness to hardening program 200 as the 3D printer deposits the printing material, and the voltage is applied for the predetermined duration.

In some embodiments, the ultrasonic measurements of the level of hardness of the printing material are performed during the generation of a knowledge corpus that includes the level of hardness attained with a corresponding set of parameters and are not measured during printing. In other embodiments, the ultrasonic measurement is performed during printing, providing dynamic feedback of the level of hardness attained at a set of parameters. The level of hardness attained is based on the values of the set of parameters of the voltage applied and the duration of the voltage applied to the printing material. The ultrasonic contact impedance technique and ultrasonic wave velocities have been used for non-destructive hardness measurement. Ultrasonic wave velocity shift provides average hardness for material thickness.

In an alternative embodiment, an initial level of hardness is attained across all portions of the print object and conductive wires are added during printing to make contact with portions of the print object requiring a higher level of hardness. Subsequent to printing, a voltage is applied to the respective wires for durations corresponding to the required level of hardness, and the wires are removed.

For example, 3D printer 140 performs deposition of the printing material on print object 180, such as hardening portion 190. Ultrasonic device 135 performs an ultrasonic measurement of hardness of hardening portion 190 dynamically during printing operations. Ultrasonic device 135 transmits the hardness measurement data to hardening program 200 via network 150.

Hardening program 200 determines whether the hardness of the portion of the printed object attains the target level of hardness (decision step 240). Having received the dynamic hardness measurement data of the printing material, hardening program 200 determines whether the measured hardness meets the expected target level of hardness for the portion of the print object by comparison of the hardness measurement data from the ultrasonic measurements to the metadata associated with the original object.

For the case in which hardening program 200 determines that the target level of hardness for the portion of the printed object is not attained (step 240, "NO" branch) hardening program 200 proceeds to step 250 and adjusts the set of parameters of voltage and duration of the voltage applied to the printing material to achieve the target level of hardness of the respective portion of the printed object. Hardening program 200 determines an adjustment to the voltage and duration parameters applied to the printing material to attain the target level of hardness for the respective portion of the print object. In some embodiments, hardening program 200 continually receives dynamic measurements of the level of hardness of the printing material as the printing material is deposited and hardened by the application of parametric voltage and duration from the ultrasonic device. In other embodiments, hardening program 200 instructs the ultrasonic device to perform snapshot measurements of printing material at predetermined intervals. In yet other embodiments, hardening program 200 activates the ultrasonic measurements to coincide with the printing of a portion of the print object in which the level of hardness changes.

Having made an adjustment to the set of parameters applied to the printing material, hardening program 200 returns to step 240 to determine whether the portion of the printed object is at the target level of hardness, as determined by ultrasonic measurement of the printing material, and proceeds as described above.

For the case in which hardening program 200 determines that the target level of hardness for the portion of the printed object is attained (step 240, "YES" branch) hardening program 200 proceeds to step 260 and continues 3D printing based on the predetermined set of parameters of voltage and duration applied during the printing of the object. In some embodiments, hardening program 200 continues to receive ultrasonic hardness measurements and if the measurement data indicates that the target level of hardness is not attained as the printing material is deposited (step 240, "NO" branch; note dual pathway between step 240, "YES" branch and step 260), hardening program 200 proceeds to step 250 and performs an adjustment to the set of parameters. In some embodiments, hardening program 200 continues printing activity until the metadata of the print object indicates a change in the target level of hardness for a next portion of the print object.

Hardening program 200 determines whether 3D printing of the object is complete (decision step 270). Hardening program 200 continues printing activity and hardness curing by applying the set of parameters to the printing material deposited for the respective portion of the print object. Hardening program 200 determines whether the 3D metadata of the original object has been completely performed by the 3D printer, determining whether there are other portions of the print object to print. For the case in which hardening program 200 determines that 3D printing is not complete, hardening program 200 advances to a next portion (step 280) of the print object and proceeds to decision step 240 to determine whether the target level of hardness of the next portion of the printed object is attained, and proceeds as described above.

For the case in which hardening program 200 determines that 3D printing of all print object portions is complete, hardening program 200 ends.

Figure 3:
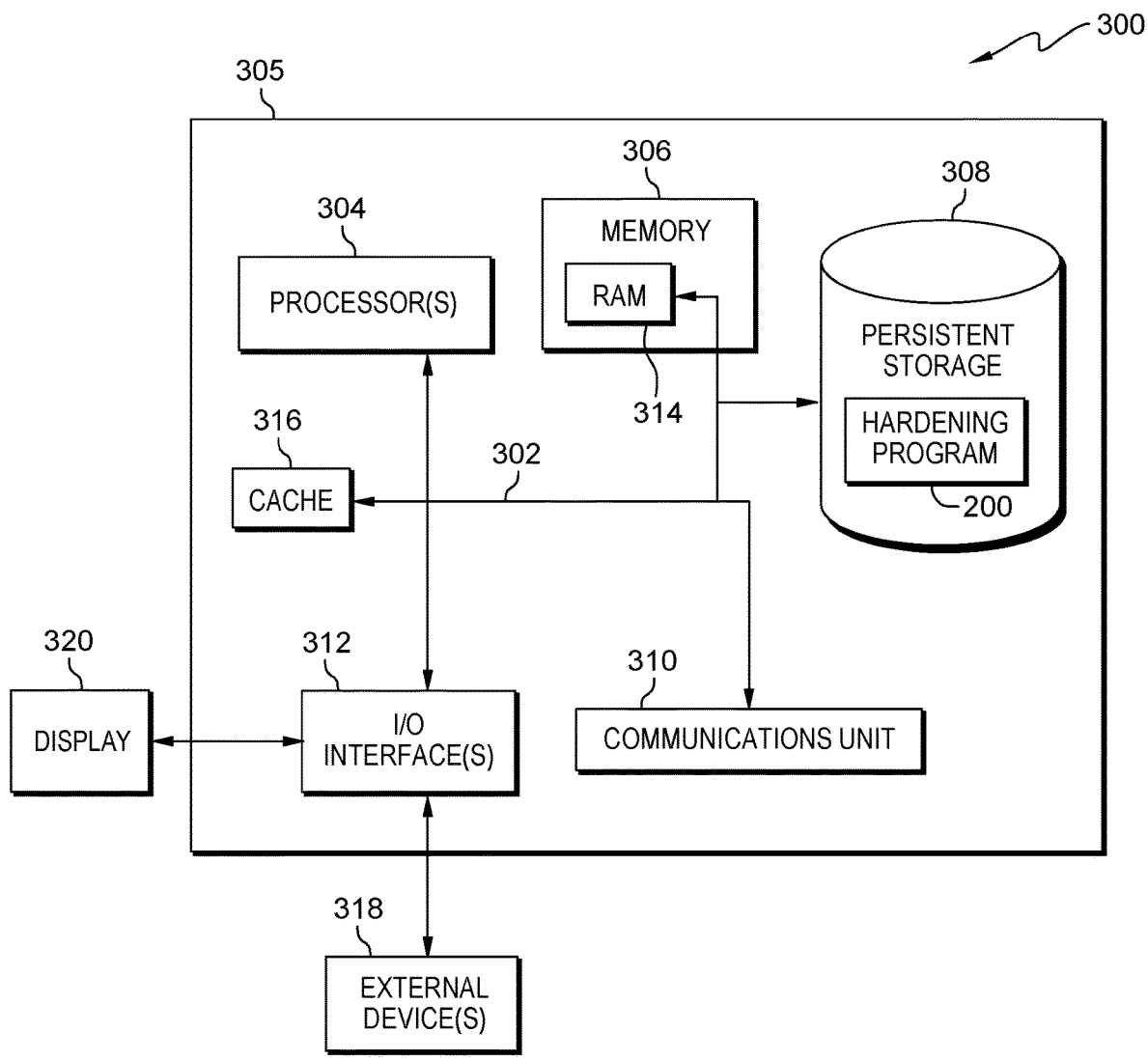
FIG. 3 depicts a block diagram of components of a computing system, including a computing device configured to operationally perform the hardening program of FIG. 2, in accordance with an embodiment of the present invention.

FIG. 3 depicts a block diagram of components of computing system 300, including computing device 305, configured to include or operationally connect to components depicted in FIG. 1, and with the capability to operationally perform hardening program 200 of FIG. 2, in accordance with an embodiment of the present invention.

Computing device 305 includes components and functional capability similar to components of computing device 110, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, hardening program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Hardening program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., hardening program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for three-dimensional (3D) printing including hardness variation within a print object, the method comprising:
receiving, by one or more processors, metadata associated with 3D printing of a print object, the metadata indicating that a level of hardness of a printing material varies across two or more portions of the print object during printing of the print object;
applying, by the one or more processors, during the 3D printing of the print object, a pre-determined set of parameters including an electrical voltage and a duration of the electrical voltage to the printing material, wherein the predetermined set of parameters correspond to a first target level of hardness for a first portion of the print object and a second target level of hardness for a second portion of the print object as indicated by the metadata associated with the 3D printing of the print object, and wherein the first target level of hardness is different than the second target level of hardness;
measuring, by the one or more processors, during the 3D printing of the print object, the level of hardness for the first portion of the print object, by use of an ultrasonic device; and
in response to determining the level of hardness of the first portion of the 3D printing of the print object differs from the first target level of hardness indicated in the metadata associated with the first portion of the print object, adjusting, by the one or more processors, at least one of the electrical voltage and the duration of the electrical voltage of the predetermined set of parameters applied to the printing material to attain the first target level of hardness for the first portion of the print object.

2. The method of claim 1, further comprising:
controlling, by the one or more processors, the level of hardness associated with the printing material by adjusting the electrical voltage applied to the printing material as the printing material is deposited onto the print object.

3. The method of claim 1, wherein the printing material is a conductive liquid that hardens in response to applying the predetermined set of parameters including the electrical voltage and the duration of applying the electrical voltage to the printing material.

4. The method of claim 1, further comprising:
recording, by the one or more processors, the level of hardness measured during performance of a plurality of 3D printing instances and applying varying sets of parameters to the printing material during the plurality of instances of 3D printing;
generating, by the one or more processors, a knowledge corpus that associates parameter values to respective levels of hardness by hardness measurement received during performance of the plurality of instances of 3D printing;
identifying, by the one or more processors, from respective metadata of the plurality of 3D printing instances including data indicating a level of hardness of respective portions of objects associated with the plurality of 3D printing instances a required amount of electrical voltage and duration of applying the electrical voltage; and
selecting, by the one or more processors, the set of parameters from the knowledge corpus corresponding to the level of hardness indicated by the respective metadata of the plurality of 3D printing instances.

5. The method of claim 1, wherein the set of parameters are dynamically applied to the printing material by electrodes contacting the printing material as the printing material is deposited to the print object, and wherein at least one electrode is associated with a nozzle of a 3D printer.

6. The method of claim 1, wherein conductive wires are placed on the print object during 3D printing of the print object, and the level of hardness for respective portions of the print object that include the conductive wires is attained by applying the voltage for a duration consistent with the set of parameters corresponding to the target level of hardness to respective conductive wires subsequent to 3D printing.

7. The method of claim 1, wherein the measurement by the ultrasonic device is performed dynamically during 3D printing of the print object.

8. The method of claim 1, wherein the measurement by the ultrasonic device during the 3D printing is matched with the set of parameters associated with the measurement and added to a knowledge corpus that associates parameter values to respective levels of hardness.

9. A computer program product for three-dimensional (3D) printing including hardness variation within a print object, the method comprising:
one or more computer-readable storage media, and program instructions stored on the one or more computer-readable storage media, the program instructions comprising:
program instructions to receive metadata associated with 3D printing of a print object, the metadata indicating a level of hardness of a printing material varies across portions of the print object during printing of the print object;
program instructions to apply during 3D printing of the print object, a pre-determined set of parameters including an electrical voltage and a duration of the electrical voltage to the printing material, wherein the predetermined set of parameters correspond to a first target level of hardness for a first portion of the print object and a second target level of hardness for a second portion of the print object as indicated by the metadata associated with the 3D printing of the print object, and wherein the first target level of hardness is different than the second target level of hardness;
program instructions to measure during the 3D printing of the print object, the level of hardness for the first portion of the print object, by use of an ultrasonic device; and
in response to determining the level of hardness of the first portion of the 3D printing of the print object differs from the first target level of hardness indicated in the metadata associated with the first portion of the print object, program instructions to adjust at least one of the electrical voltage and the duration of the electrical voltage of the predetermined set of parameters applied to the printing material to attain the first target level of hardness for the first portion of the print object.

10. The computer program product of claim 9, further comprising:
program instructions to control the level of hardness associated with the printing material by adjusting the electrical voltage applied to the printing material as the printing material is deposited onto the print object.

11. The computer program product of claim 9, wherein the printing material hardens in response to applying the predetermined set of parameters including the electrical voltage and the duration of applying the electrical voltage to the printing material.

12. The computer program product of claim 9, further comprising:
program instructions to record the level of hardness measured during performance of a plurality of 3D printing instances and applying varying sets of parameters to the printing material during the plurality of instances of 3D printing;
program instructions to generate a knowledge corpus that associates parameter values to respective levels of hardness by hardness measurement received during performance of the plurality of instances of 3D printing;
program instructions to identify from respective metadata of the plurality of 3D printing instances including data indicating a level of hardness of respective portions of objects associated with the plurality of 3D printing instances a required amount of electrical voltage and duration of applying the electrical voltage; and
program instructions to select the set of parameters from the knowledge corpus corresponding to the level of hardness indicated by the respective metadata of the plurality of 3D printing instances.

13. The computer program product of claim 9, wherein program instructions dynamically apply the set of parameters to the printing material during 3D printing by electrodes contacting the printing material as it is deposited to the print object, and wherein at least one electrode is associated with a nozzle of a 3D printer.

14. The computer program product of claim 9, further comprising:
program instructions to match the measurement of the level of hardness by the ultrasonic device during the 3D printing with the set of parameters associated with the measurement; and
program instructions to add the measurement of the level of hardness and a corresponding set of parameters to a knowledge corpus that associates parameter values to respective levels of hardness.

15. A computer system for three-dimensional (3D) printing including hardness variation of a printed object, the computer system comprising:
one or more computer processors;
one or more computer-readable storage media, and program instructions stored on the one or more computer-readable storage media, the program instructions comprising:
program instructions to receive metadata associated with 3D printing of a print object, the metadata indicating that a level of hardness of a printing material varies across portions of the print object during printing of the print object;
program instructions to apply during 3D printing of the print object, a pre-determined set of parameters including an electrical voltage and a duration of the electrical voltage to the printing material, wherein the predetermined set of parameters correspond to a first target level of hardness for a first portion of the print object and a second target level of hardness for a second portion of the print object as indicated by the metadata associated with the 3D printing of the print object, and wherein the first target level of hardness is different than the second target level of hardness;
program instructions to measure during the 3D printing of the print object, the level of hardness for the first portion of the print object, by use of an ultrasonic device; and
in response to determining the level of hardness of the first portion of the 3D printing of the print object differs from the first target level of hardness indicated in the metadata associated with the first portion of the print object, program instructions to adjust at least one of the electrical voltage and the duration of the electrical voltage of the predetermined set of parameters applied to the printing material to attain the first target level of hardness for the first portion of the print object.

16. The computer system of claim 15, further comprising:
program instructions to control the level of hardness associated with the printing material is further controlled by program instructions to adjust the electrical voltage applied to the printing material as the printing material is deposited on to the print object.

17. The computer system of claim 15, wherein the printing material hardens in response to applying the predetermined set of parameters including the electrical voltage and the duration of applying the electrical voltage to the printing material.

18. The computer system of claim 15, further comprising:
program instructions to record the level of hardness measured during performance of a plurality of 3D printing instances and applying varying sets of parameters to the printing material during the plurality of instances of 3D printing;
program instructions to generate a knowledge corpus that associates parameter values to respective levels of hardness by hardness measurement received during performance of the plurality of instances of 3D printing;
program instructions to identify from respective metadata of the plurality of 3D printing instances including data indicating a level of hardness of respective portions of objects associated with the plurality of 3D printing instances a required amount of electrical voltage and duration of applying the electrical voltage; and
program instructions to select the set of parameters from the knowledge corpus corresponding to the level of hardness indicated by the respective metadata of the plurality of 3D printing instances.

19. The computer system of claim 15, wherein program instructions dynamically apply the set of parameters to the printing material by electrodes contacting the printing material as it is deposited to the print object, and wherein at least one electrode is associated with a nozzle of a 3D printer.

20. The computer system of claim 15, wherein program instructions to measure the level of hardness of the printing material by the ultrasonic device is performed dynamically during 3D printing of the print object.

* * * * *